Jan. 11, 1966   H. T. KELSH   3,228,285
LINKAGE FOR PHOTOGRAMMETRIC PROJECTION INSTRUMENT
Filed June 5, 1963   3 Sheets-Sheet 1

INVENTOR
HARRY T. KELSH
BY Albert J. Kramer
ATTORNEY

Jan. 11, 1966  H. T. KELSH  3,228,285
LINKAGE FOR PHOTOGRAMMETRIC PROJECTION INSTRUMENT
Filed June 5, 1963  3 Sheets-Sheet 2

*INVENTOR*
HARRY T. KELSH

BY *Albert J. Kramer*
ATTORNEY

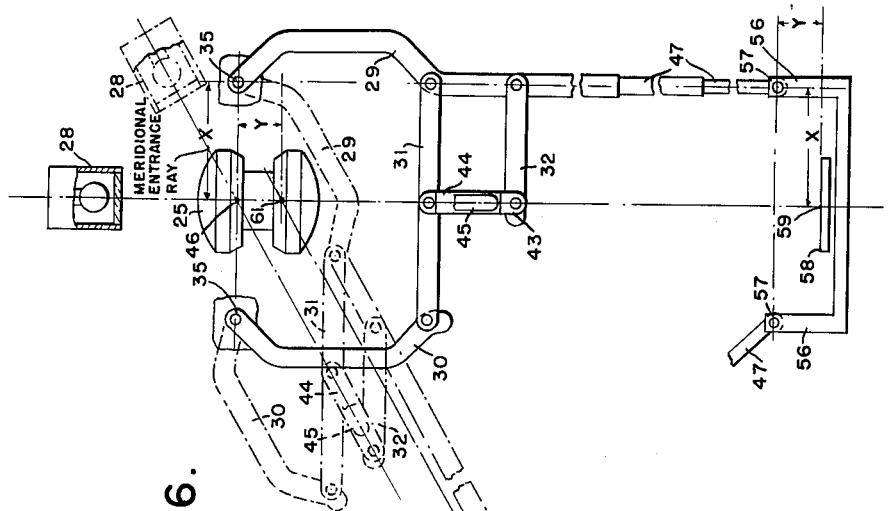
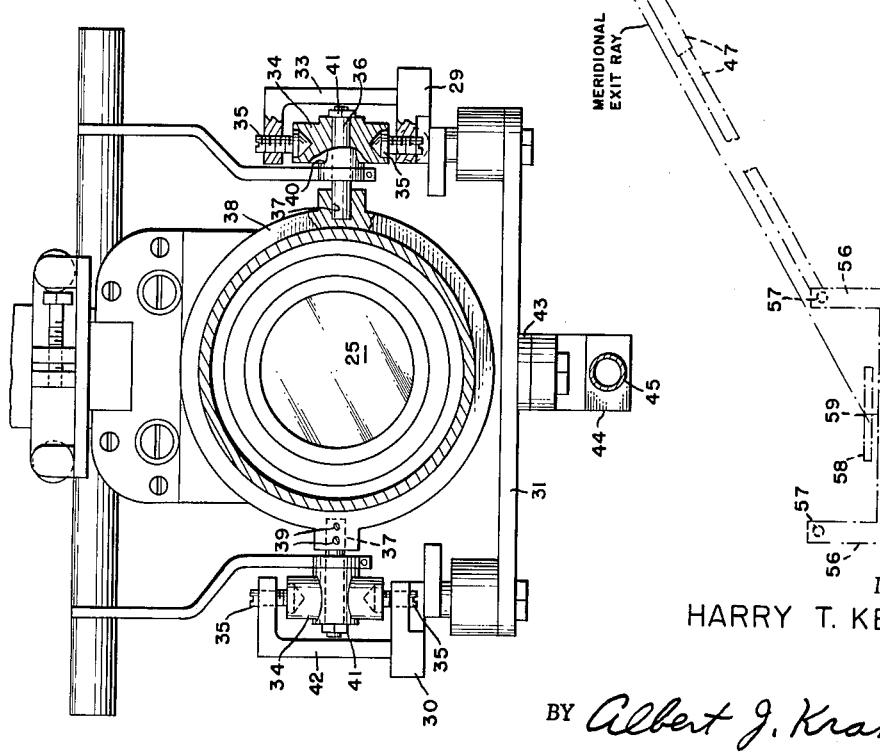
FIG. 5.
FIG. 6.
INVENTOR
HARRY T. KELSH
BY Albert J. Kramer
ATTORNEY 3,228,285
LINKAGE FOR PHOTOGRAMMETRIC
PROJECTION INSTRUMENT
Harry T. Kelsh, Washington, D.C., assignor to Kelsh Instrument Co., Inc., Baltimore, Md., a corporation of Maryland
Filed June 5, 1963, Ser. No. 285,699
4 Claims. (Cl. 88—24)

This invention relates to photogrammetric projection instruments and it is more particularly concerned with such instruments which employ a swinging projection lamp in reference to a diapositive containing images to be projected by light from the lamp and a tracing table containing a screen for receiving the projected images.

A projection plotter of the type mentioned which is now widely used is known as the Kelsh Plotter (a registered trademark of the Kelsh Instrument Co.) which form the subject matter of U.S. Patent No. 2,492,870. This instrument, basically, comprises a suitable frame structure, a fixed focus lens, normally mounted on the frame, a movable tracing table on one side of the lens, a light source or lamp on the other side of the lens and a linkage connecting the light source, tracing table and frame in order to constrain the tracing table and light source to move relative to the lens so to cause the image carried by light from the source passing through the lens to be focused on the tracing table within practical limits for different positions of the light source.

In conventional photogrammetric projection instruments of this type the projection lens employed is made up of lens elements having special characteristics to meet certain requirements. It will be understood that the images of the diapositives represent photographs taken by aerial cameras mounted in airplanes that are flown at elevations of 1,000 to 20,000 or more feet. The lens of the camera, therefore must be focused at infinity. Ideally, the lens of the projector instrument should also be focused at infinity in order to match the camera lens and obtain a projection corresponding to the image of the photograph taken by the camera. Such an instrument can not be provided practically, because of space limitations, and, hence, a projection lens having a fixed focus at a finite distance must be used instead. Special lenses for this purpose have been provided. These lenses are designed so that the image rays which emerge are geometrically arranged similar to the incident rays of the camera lens, but focused at a fixed distance within the physical limitations of the projection instrument instead of at infinity.

Since the height of the projection screen varies in operation between definite limits, it is further necessary that the image projected on the tracing table be sufficiently sharp within the variations of height of the projection screen to permit accurate measurements. With a fixed focus lens, this require the use of a small optical aperture. The use of a small aperture, however, while providing a sharper image, provides correspondingly less light which limits the areas of the diapositive that can be effectively covered. Particular difficulty is experienced in the outer areas or "corners" of the diapositive which is conventionally a 9" x 9" square glass plate. With present limitations of technology in the illumination art, it is a practical difficult to provide adequate light at points outside a 90° cone of rays emerging from the projection lens. This is not only due to limitations in intensity of available light sources, but also in the drastic fall off of light intensity as the angles of the cone of light rays increase.

These practical factors have presented a formidable obstacle in developing wide projection angles for such photogrammetic instruments.

The basic object of the invention is the provision of a photogrammetric projection instrument of the type mentioned having a relatively wide projection angle in comparison to conventional instruments that are limited to angles of about 90°.

Another object of the invention is to the provision of improvements in a photogrammetric projection instrument of the type mentioned that retains the basic function and advantages of the instrument under relatively wide projecion angles.

A further object of the invention is the provision of a novel combination of lens and associated linkage for controlling the light source and tracing table so as to permit projection angles greater than 90° and as much as 120°.

Other objects of the invention and various features and advantages thereof over the prior art will be apparent from the following description considered together with the accompanying drawing.

In the drawing:

FIG. 5 is a plan sectional view along the line 5—5 of FIG. 2.

FIG. 6 is a schematic elevational view of the linkage system in two different positions to illustrate the principle of the invention.

Figure 1:
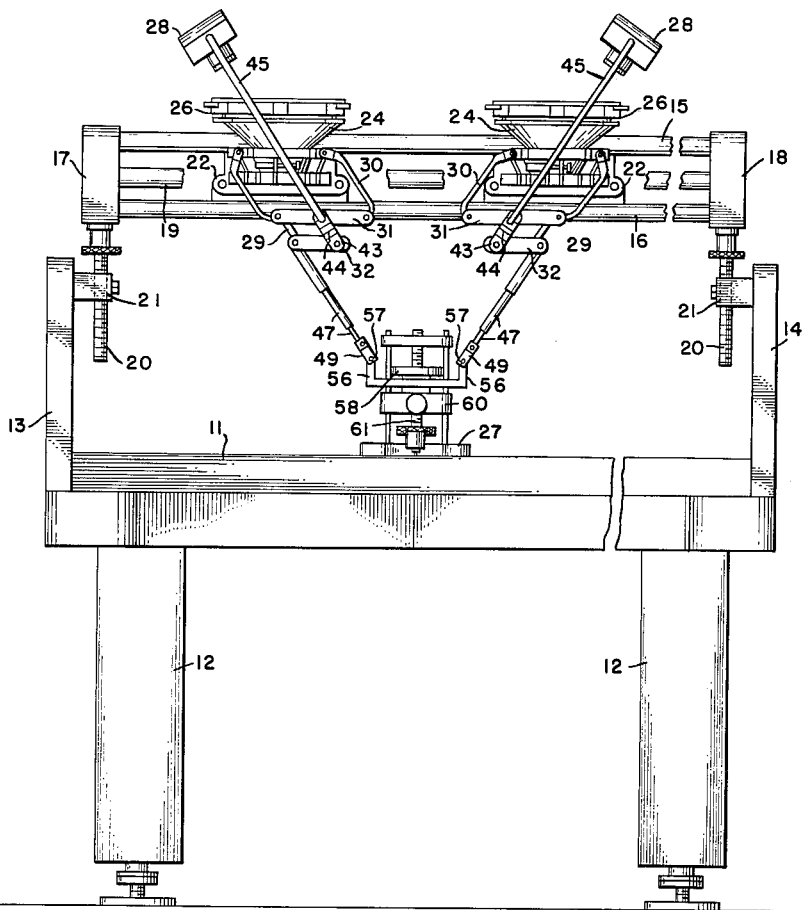
FIG. 1 is a front elevational view of a photogrammetric projection instrument comprising an embodiment of the invention.
Figure 4:
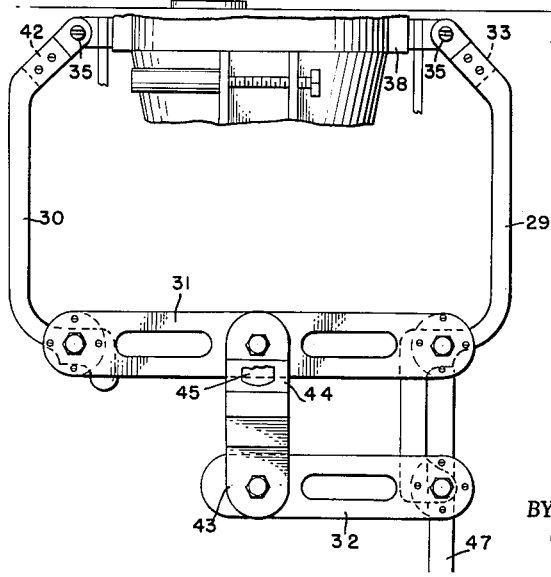
FIG. 4 is an elevational view of the linkage system as shown in FIG. 1 on a larger scale and with parts broken away.
Figure 2:
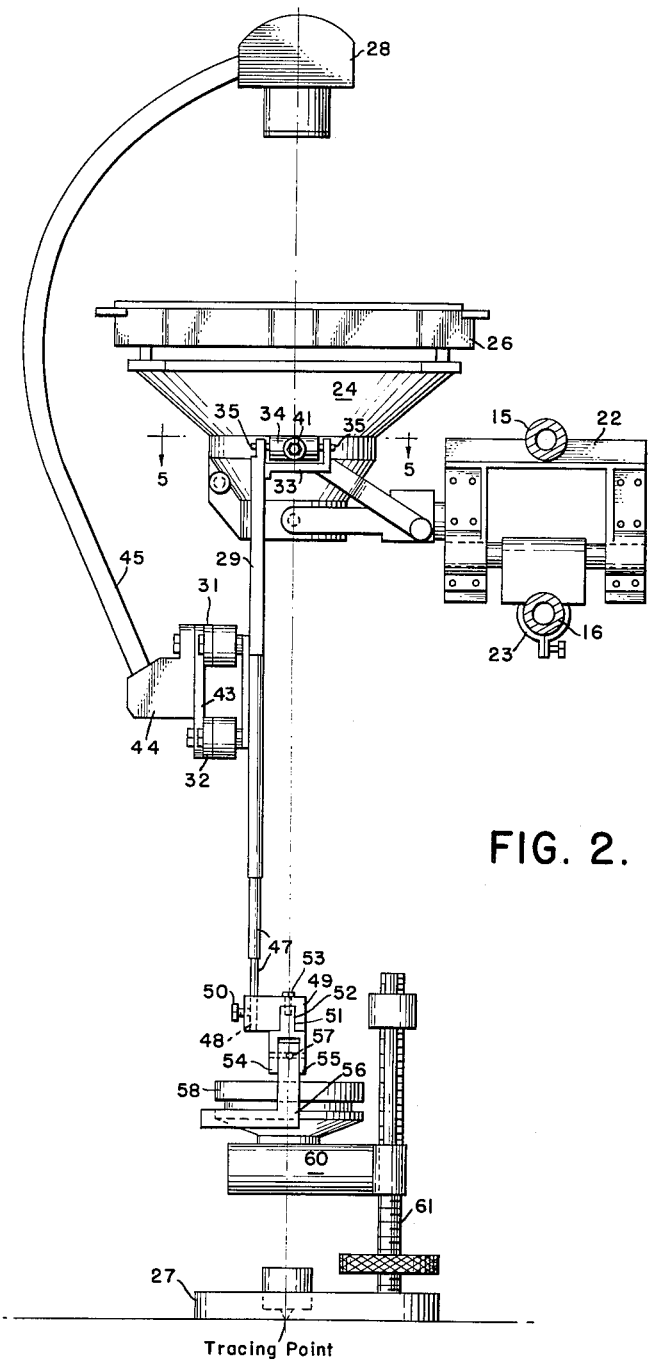
FIG. 2 is a side elevational view of the linkage comprising the embodiment and appurtenant portions, fragmentarily shown, of the instrument.
Figure 3:
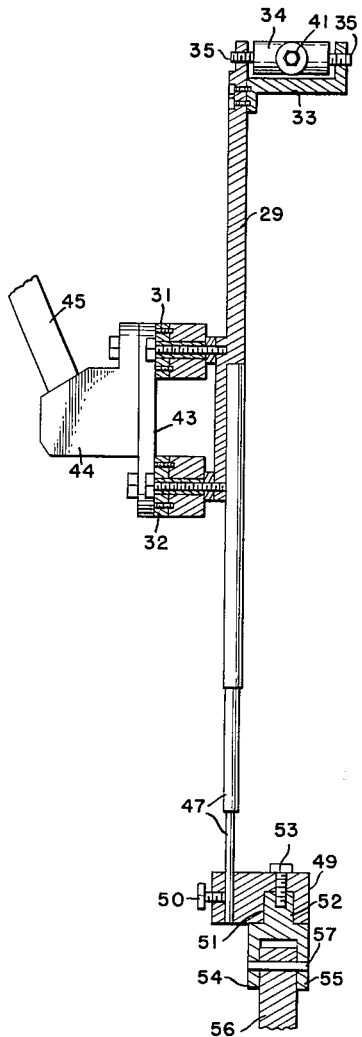
FIG. 3 is a vertical sectional view of a portion of FIG. 2 on a larger scale in a plane parallel to the plane of FIG. 2.

Referring to the drawing with more particularity, the embodiment is illustrated as an integral part of a photogrammetric instrument that comprises a mapping table 11 supported on legs or pillars 12, a frame supported on the table, including side panels 13 and 14 and horizontal tracks 15 and 16 set one above the other in end pieces 17 and 18. A bracing bar 19 is also set in the end pieces to hold them with the rails as a rigid structural unit, which unit as a whole is adjustably mounted on the side panels by means of screws 20 threadedly engaging offset arms 21 of the side panels.

Between the tracks 15 and 16, there are slidably mounted carriages 22, each of which can be clamped in different positions longitudinally along the tracks by means of a collar clamp 23.

Secured to and projecting forwardly from each carriage 22 is a projection unit 24 which contains a projection lens 25 and a diapositive mount 26.

The tracing table 27 is carried on the mapping table 11 below the projection units 24 and a light projector 28 is disposed above each projection unit, supported and moved by the linkage hereinafter described.

The linkage comprises an outer vertical link 29, an inner vertical link 30 and a pair of horizontal links 31 and 32. The upper end of the link 29 comprises a rearwardly offset yoke 33 which is pivotally attached to the ends of a cross bar 34 by means of conical pivot bearings 35, 35. The bar 34 is rotatably carried on a trunnion 36 which is set in a socket 37 of the housing 38 of the projector unit 24 and releasibly secured thereto by set screws 39. The trunnion 36 is in the plane containing the entrance node at right angles to the longitudinal axis of the lens. The bar 34 is held on the trunnion between an inner collar 40 and a holding nut 41.

The upper end of the inner link 30 comprises a rearwardly offset yoke 42 which is similarly mounted by corresponding similar elements, which are identified in the drawing by like reference numerals.

An intermediate vertical link 43 is connected across the horizontal links 31 and 32 to which is attached a bracket 44. The bracket is rigidly secured to and it supports the lower end of an arm 45. The upper end of the arm 45 carries the light projector 28 oriented in a position such that its projection axis is always aligned with the entrance node 46 of the projection lens 25.

The outer link 29 of the linkage comprises an extension of telescopable sections 47, the terminal section being adapted to seat in a socket 48 at the forward end of an offsetting connecter member 49 and releasibly secured therein by a set screw 50. The inner end of the connector member has a socket 51 for receiving the stem of a yoke bearing 52 and to which it is releasibly attached by a screw 53. The arms 54 and 55 of the yoke bearing 52 are pivotally attached to the top of a vertical member 56 by a pintle 57 on one side of the tracing table 27. The tracing table comprises the conventional projection screen or platen 58 having a floating mark 59 at its center. The platen is mounted on an arm 60 which is elevationally movable by the conventional means of a vertical screw 61. These parts are so connected together and proportioned that the pintle 57 is in a horizontal plane above platen 58 at a distance equal to the distance between the entrance node 46 and the exit node 61 of the lens 25, while the horizontal distance between the vertical axis of the platen and the pivot axis of the pintle 57 is equal to the distance between the entrance node 46 and the pivot axis of the bearings 35, 35. See FIG. 6 showing these distances as "Y" and "X," respectively.

By these means the tracing table and the light projector are constrained to move so that (1) light emanating from the light projector in the form of a converging cone is focused upon the entrance node of the projection lens in all positions as the light projector is swung to illuminate any desired portion of the diapositive, and (2) the meridional image ray from the exit node of the lens is at all times parallel to the corresponding meridional entering ray and is coincident with the center of the platen through all variations of vertical or horizontal motions of the platen within the operating limits of the device.

Having thus described my invention, I claim:

1. A photogrammetric projection instrument having a frame, a fixed lens mounted on the frame, said lens having an entrance node and an exit node in spaced relation along its optical axis, a movable tracing table on the light exit side of the lens, said table having a tracing point, a light source on the light entrance side of the lens, and a linkage connecting the light source, tracing table and frame for constraining the tracing table and light source to move relative to the lens so as to cause light from the source to pass through the lens and fall on the tracing table for different positions of the light source, said linkage comprising an arm pivoted at one end to the frame at a first point in the plane of the entrance node at right angles to the optical axis of the lens and at a fixed distance from the entrance node, the other end of the link being pivoted to the tracing table at a point spaced from a line passing through the tracing point of the tracing table perpendicular to the tracing table a distance equal to the distance between the entrance node and the said first point and in a plane spaced above the pane of the tracing table a distance equal to the distance between the said nodes of the lens.

2. A photogrammetric projection instrument as defined by claim 1 in which the portion of the linkage between the lens and the tracing table is offset out of the path of light projected by the lens onto the tracing table.

3. A photogrammetric projection instrument having a frame, a fixed lens mounted on the frame, said lens having an entrance node and an exit node, a movable tracing table on the light emerging side of the lens, said table having a tracing point, a light source on the light incident side of the lens, and means for constraining the tracing table and light source to move so that the entrance node is always in line with the projection axis of the light source, and the center of the platen of the tracing table is always in a line with the exit node parallel to the projection axis of the light source when the projection axis of the light source is at an angle to the longitudinal axis of the lens.

4. A photogrammetric projection instrument as defined by claim 1 in which the linkage is a parallelogram linkage.

References Cited by the Examiner
UNITED STATES PATENTS

| | | | |
|---|---|---|---|
| 2,747,461 | 5/1956 | Boughton et al. | 88—24 |
| 2,938,428 | 5/1960 | Nistri | 88—24 |
| 3,060,798 | 10/1962 | Yzerman | 88—24 |

NORTON ANSHER, *Primary Examiner.*